Sept. 24, 1940.                    L. V. BJONG                    2,215,537
                    SEALING MEANS FOR INDICATING INSTRUMENT CASINGS
                                  Filed May 11, 1938
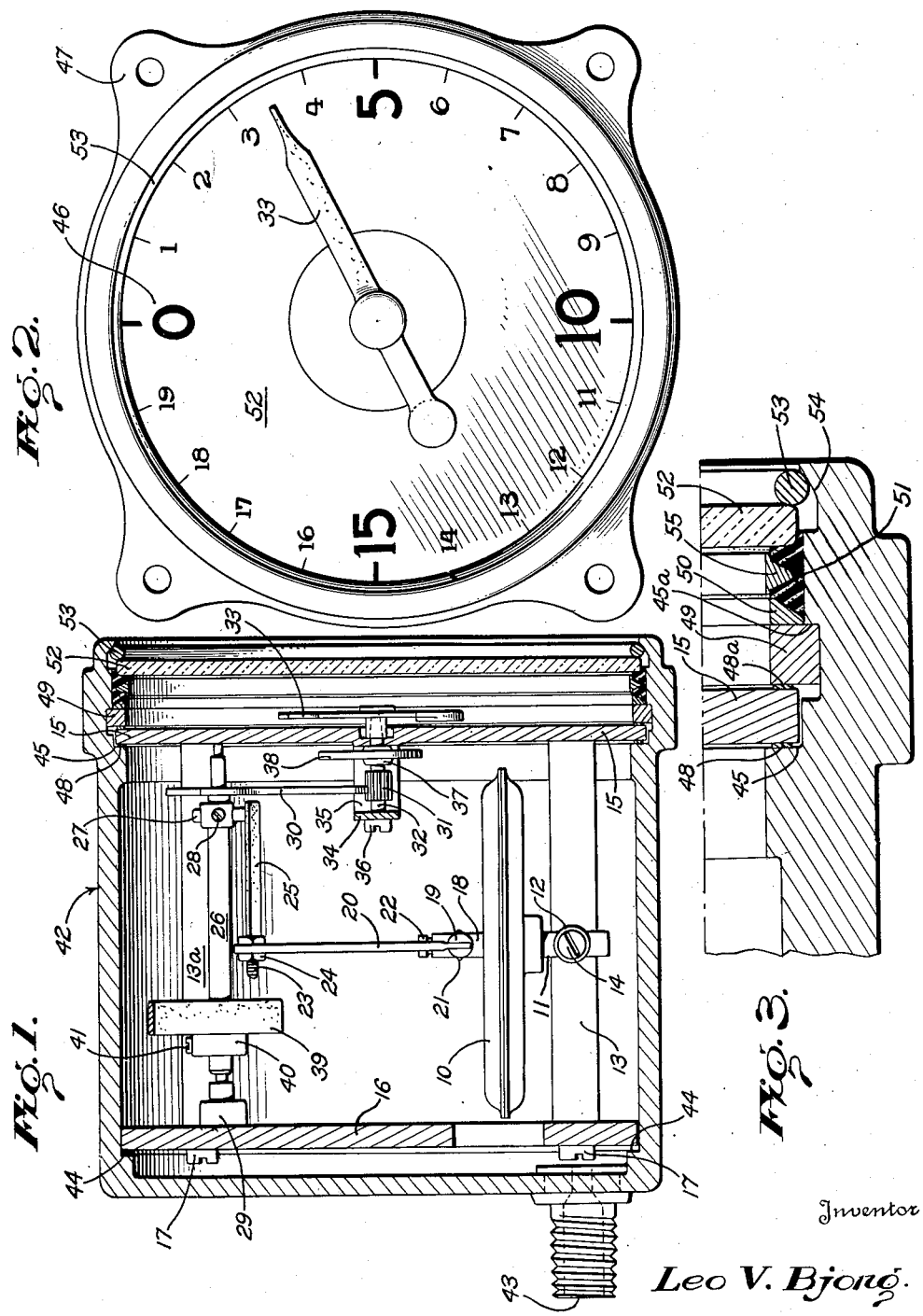
Inventor
Leo V. Bjong.
By Stephen Cerstvik
          Attorney Patented Sept. 24, 1940

2,215,537

UNITED STATES PATENT OFFICE 2,215,537

SEALING MEANS FOR INDICATING INSTRUMENT CASINGS

Leo V. Bjong, Brooklyn, N. Y., assignor to Bendix Aviation Corporation, South Bend, Ind., a corporation of Delaware Application May 11, 1938, Serial No. 207,376

9 Claims. (Cl. 73—151)

The present invention relates to indicating instruments and more particularly to indicating instruments of the pressure actuated type, such for example as altimeters, air-speed indicators, manifold pressure indicators, rate of climb devices and the like.

More specifically, the present invention relates to novel means for sealing the casing of a pressure-responsive indicating instrument and for locking the indicating mechanism thereof within the casing whereby the pressure inside of the casing may be maintained free of disturbances by any existing extraneous pressures, and whereby the mechanism is locked in position against vibration and is an improvement on the invention disclosed in the copending application of Roy C. Sylvander, Serial No. 207,392, filed May 11, 1938.

Similar devices of the prior art have been utilized heretofore in order to seal the casings of pressure-responsive indicating instruments and to lock the indicating mechanisms therein but such devices have been affected by changes in temperature, and have been subjected to undesired leakage so that they did not satisfactorily maintain the pressure inside of the casings of such instruments free from disturbances due to extraneous pressures. Further, devices of the prior art have failed to maintain the mechanisms tightly in place in the casings due to failure of the closure means to take up play between the indicating mechanisms and the casings due to tolerances in machining the casings during manufacture in large quantities, and have further failed to provide a proper clinching action for maintaining the mechanisms in place in the casings against vibration or other disturbing factors. In view of the above conditions prevailing in the prior art, one of the objects of the present invention is to provide novel closure means for indicating instrument casings, whereby the foregoing undesirable characteristics are eliminated.

Another object is to provide, in a pressure-responsive indicating instrument, novel casing closure elements which are not affected by temperature changes or by vibration.

A further object is to provide a pressure-responsive indicating instrument comprising a casing, a pressure-responsive mechanism in said casing, and means for sealing the mechanism in the casing, comprising novel means for taking up any irregularities in said casing due to tolerances existing in the manufacture thereof.

Still another object of the invention is to provide, in a pressure-responsive indicating instrument, a casing, a pressure-responsive mechanism in said casing, and means for sealing the mechanism in said casing comprising novel means for resiliently sealing said casing against pressure leaks.

Still another object is to provide novel means for locking a mechanism upper plate in position, to prevent warpage of the mechanism plate.

Still another object is to provide in a pressure-responsive indicating instrument, a casing, a pressure-responsive mechanism in said casing, and means for sealing the mechanism in said casing, comprising a mechanism plate, a spacing ring, a sealing ring and a composite resilient sealing gland, a cover glass, and resilient means cooperating with said casing to urge said cover glass and sealing means together against said spacing ring to seal the mechanism in said casing against pressure variations therein.

The above and further objects and advantages of the present invention will appear more fully hereinafter from a consideration of the detailed description which follows, taken together with the accompanying drawing wherein is illustrated one embodiment of the invention.

It is to be expressly understood, however, that the drawing is for purposes of illustration and description only and is not designed as a definition of the limits of the invention, reference primarily being had for this purpose to the appended claims.

In the single sheet of drawings, wherein like reference characters refer to like parts throughout the several views;

Fig. 1 is a side elevation in section of one form of complete indicating instrument embodying the invention and comprising a casing, a pressure-responsive mechanism and the novel means for sealing the mechanism into the casing;

Fig. 2 is a front view of the instrument as illustrated in Fig. 1; and

Fig. 3 is an enlarged detailed section of a portion of the instrument shown in Fig. 1, illustrating in detail the location and relative arrangement of the novel sealing, locking and warpage preventing means.

Referring to the drawing and more particularly to Fig. 1, the instrument embodying the present invention is shown, by way of example, in the form of an altimeter having a pressure-responsive diaphragm 10 carried by a rod 11 mounted on a hollow rod 12 connected at right angles to a bottom spacing rod 13 and held in place in the rod 12 by a screw 14. Bottom spacing rod 13 is located between a face plate or mechanism top plate 15 and a rear frame member or plate 16 to which a top spacer 13a is connected by screws 17. The plates 15 and 16 are also connected together by a third spacer not shown in the drawing.

Adjustably mounted on a center post 18 on the top side of diaphragm 10 is a rod 19 to which is pivoted one end of a link 20 by a pin 21. A screw 22 fastens the rod 19 in place in the center post 18 after it has been properly adjusted. Rotatably connected to the other end of link 20 by means of threaded pin 23 and nuts 24 is a bimetal element 25 which is adjustably mounted on a rock-shaft 26 by means of a rod 27 rotatably mounted in said rock-shaft and locked in adjusted position therein by a screw 28.

Rock-shaft 26 is mounted for rotation by extensions thereof, one of which is journaled in a boss 29 formed in the back plate 16 and the other end of which is journaled in the mechanism top plate 15.

Mounted on rock-shaft 26 adjacent rod 27 is a sector gear 30 meshing with a pinion 31 secured to or formed integral with a shaft 32 carrying a pointer 33 at one end thereof. Shaft 32 is journaled at one end in a plate 34 mounted on the front plate 15 by means of spacers 35 and screws 36 and is journaled at its other end in the face plate 15. Attached to shaft 32 is a collar 37 to which is fastened one end of a small spiral spring 38, the other end of the spring being connected to one of the spacers 35 in order to take up any back-lash between the pinion 31 and sector gear 30.

Mounted on rock-shaft 26 is large spiral spring 39 one end of which is connected to one of the upper spacers 13 while the other end is connected to the rock-shaft 26 by means of a collar 40 and set screw 41, whereby the link 20 is continuously maintained in a state of tension or compression, as desired.

The above-described mechanism is enclosed in a casing 42 which is provided with an inlet 43 connected, for example, to the static connection of a Pitot-static tube, whereby the pressure of the atmosphere is conducted into the casing 42 and to the outside of diaphragm 10.

In assembling the instrument, into the casing 42, the mechanism top plate 15 comes into contact with an abutment 45 as will be set out in detail later, a clearance being provided between shoulder 44 and back plate 16 to allow for manufacturing variation. A small pin (not shown) may be inserted into the casing 42 at the periphery of the top plate 15, said top plate having a cooperating index notch whereby the mechanism is properly located and prevented from turning.

A dial 46 (Fig. 2) is formed on the face plate 15 to cooperate with pointer 33. Lugs 47 are provided integrally with casing 42 to serve as fastening means whereby the complete instrument may be mounted in the instrument panel of an aircraft or the like.

The novel means of the present invention are now provided and comprise a novel sealing, warpage-preventing and locking means whereby the mechanism is sealed and held locked in position in the casing 42 in contact with the abutment 44 and maintained in position with respect to abutment 45 whereby the changing pressure within the casing is maintained free of any change due to the cock-pit pressure or any extraneous pressures existing about the instrument and mechanism plate 15 is held in position in such a manner that warpage thereof is prevented.

Referring to Fig. 3, the novel sealing, warpage-preventing and locking means comprise three pairs of pressure pads 48 and 48a, pad 48 being located between the mechanism top plate 15 and abutment 45 and pad 48a being located between the mechanism top plate 15 and a split spacing ring 49, which ring is held, on the outer side thereof, by abutment 45a. The three pairs of pressure pads 48 and 48a are fastened to the top plate on opposite sides thereof and the pairs are distributed about the circumference of mechanism plate 15 and comprise novel means whereby said plate is held in position and warpage thereof is prevented. By the utilization of three points of pressure distribution, which are the minimum for determining a plane, it has been found that warpage is prevented. The use of a lesser or greater number of pressure distribution points fails to prevent such warpage and the generically triangular distribution of the pressure points constitutes the unique means whereby all warpage is prevented.

A sealing ring 50 composed of brass or like material abuts ring 49 at one side thereof and provides an inclined surface at the other side thereof which wedges, against the casing wall, the composite rubber sealing gland 51 composed of a plurality of triangular shaped elements joined together at the base. This wedging action takes place when cover glass 52 is urged to the left by snap ring 53 abutting lip 54 of casing 42. A wedging action is also obtained from the inclined surface of the rubber gland 51 which lies adjacent the cover glass. A small amount of castor oil or similar lubricant is wiped on the gland 51 to lubricate the same and facilitate sealing.

A further wedging and locking action is provided by means of the solid, triangular shaped ring 55, inserted between the triangular elements of the gland 51 to urge them respectively against the ring 50 and cover glass 52 and into contact with casing 42. A cushioning effect is also obtained due to the volume of rubber in sealing gland 51.

The ring 55 is covered with the rubber gland 51 before insertion into the casing and is held in place therein between the cover glass 52 and the ring 50. The brass ring 50 holds one side of an element of the rubber sealing gland 51, while the cover glass 52, urged to the left by snap ring 53, resiliently pushes the opposite side of the rubber sealing gland 51, whereby the gland is forced against the casing to provide a most effective seal so that air leakage to the interior of the instrument is prevented. The resilient construction of the composite sealing means serves to take up any play existing in the casing due to tolerances permitted in the manufacture thereof, and also serves to effectively lock the operating mechanism in place in the casing against all vibration. Further, the solid ring 55 forces the sealing gland 51 against the ring 50 and the cover glass 52 and against casing 42 to provide additional sealing effects, whereby air leakage is completely obviated.

Thus the novel means described, provide a novel closure which is effective at all temperatures and under all conditions of vibration to seal the interior pressure of the casing against any variation due to pressure existing about the instrument casing, to prevent warpage and to mechanically lock the mechanism in place.

Novel means are therefore provided whereby the actuating mechanism of a pressure responsive indicating instrument is mechanically locked in place and effectively sealed against all changes in pressure which might affect the interior pressure of the instrument casing and warpage of the mechanism plate is prevented.

Although but one embodiment of the invention has been illustrated and described, other changes and modifications in form, materials, and relative arrangement of parts, which will now appear to those skilled in the art, may be made without departing from the scope of the invention. Reference is therefore to be had to the appended claims for a definition of the limits of the invention.

What is claimed is:

1. In a pressure-responsive indicating instrument comprising a casing having a shoulder on the inside thereof and an operating mechanism located in said casing, the combination of means for mechanically locking and pneumatically sealing said mechanism in said casing, comprising a mechanism plate abutting said shoulder, a spacing ring, a metallic sealing ring abutting said spacing ring on one side thereof and having an inclined surface at the other side thereof, a resilient sealing gland having an inclined surface on one side thereof cooperating with said first inclined surface and having an inclined surface on the other side thereof, a cover-glass, means for urging said cover-glass against said last-named inclined surface, and means intermediate the inclined surfaces of said gland for urging said gland against said casing and simultaneously producing forces in the direction of each of said inclined surfaces, whereby a seal is provided between said gland and said sealing ring, between said gland and said casing, and between said gland and said cover-glass.

2. In a pressure-responsive indicating instrument comprising a casing having a shoulder on the inside thereof and an operating mechanism located in said casing for presenting an indication, the combination of means for sealing said mechanism in said casing, comprising a mechanism plate abutting said shoulder, a spacing ring, a resilient sealing gland, means having an inclined surface cooperating with one side of said sealing gland to produce a sealing force urging said gland against said casing, said means abutting said spacing ring, means including a cover-glass abutting the other side of said gland for holding said gland in operative position in said casing, and means intermediate the sides of said gland urging said gland against said inclined surface and said cover-glass, respectively.

3. In a pressure-responsive indicating instrument comprising a casing and an operating mechanism located in said casing for presenting an indication, the combination of means for sealing said mechanism in said casing, comprising a sealing ring, a resilient sealing gland, means on said ring cooperating with one side of said gland to produce a force upon said gland having a component in the direction of said casing upon a thrust being exerted upon the other side of said gland, means for causing a thrust on said other side and comprising a cover-glass, means for urging said cover-glass against said gland, and means intermediate the sides of said gland for urging said sides in the direction of said sealing ring and said cover-glass, respectively.

4. In a pressure-responsive indicating instrument comprising a casing and an operating mechanism located in said casing for presenting an indication, the combination of means for sealing said mechanism in said casing, comprising a cover-glass, a sealing ring between said mechanism and said glass, a compressible sealing gland between said sealing ring and said glass, an inclined surface on said sealing ring, an inclined surface on one side of said gland, means cooperating with said mechanism to provide an abutment on one side of said sealing ring and means producing a thrust upon said cover-glass for urging said inclined surfaces into contact, whereby said gland is compressed in a direction towards said casing to seal the same, and means for simultaneously urging said gland against said sealing ring and said cover-glass, and for urging an intermediate part of said gland against said casing.

5. In a pressure-responsive indicating instrument comprising a casing and an operating mechanism located in said casing for presenting an indication, the combination of means for sealing said casing, comprising a cover-glass, a metallic sealing ring having a slanting side, a resilient sealing gland abutting said slanting side between said slanting side and said cover-glass comprising a plurality of triangular cross-sectioned elements joined together side by side, means producing a thrust upon said cover-glass to force said slanting side against one of said triangular elements to compress the gland against said casing to seal the same, and means between adjacent elements urging said elements against said ring, said casing and said cover-glass.

6. In a pressure-responsive indicating instrument comprising a casing and an operating mechanism located in said casing for presenting an indication, the combination of means for sealing said casing, comprising a cover-glass, a sealing gland comprising a plurality of triangular ring-shaped elements located side by side, said cover-glass abutting one side of one of said elements, means for urging said cover-glass and gland together, whereby a seal is formed between said gland, said casing and said cover glass to seal the casing, and means between adjacent elements urging said elements against said casing and said cover-glass.

7. In a pressure-responsive indicating instrument comprising a casing and an operating mechanism located in said casing for presenting an indication, the combination of means for sealing said casing, comprising a cover-glass, a triangular cross-sectioned resilient sealing gland, a second triangular gland adjacent said first gland, a rigid sealing ring, means urging said ring, said glands and said cover-glass into contact, whereby a seal is effected between said gland and said casing and between said gland and said cover-glass, and means between said glands urging said glands against said ring and said cover-glass, respectively.

8. In a pressure-responsive indicating instrument comprising a casing and an operating mechanism located in said casing for presenting an indication, the combination of means for sealing said casing, comprising a cover-glass, a resilient sealing gland abutting said cover-glass and comprising a plurality of triangular cross-sectioned elements, means between said elements for urging the same against said casing and said cover-glass, and means urging said cover-glass against said sealing gland.

9. In a device of the character described, an instrument casing provided with a cover-glass, means providing a shoulder in said casing, an operating mechanism in said casing, a mechanism plate adjacent said shoulder, pressure means including said cover-glass for urging said plate towards said shoulder, and means whereby warpage of said plate is prevented, comprising means providing three bearing points between said shoulder and said plate distributed about the periphery of said plate and three bearing points directly opposite said first three points and between said plate and said pressure means.

LEO V. BJONG.